(12) United States Patent
Chang et al.

(10) Patent No.: US 12,288,351 B2
(45) Date of Patent: Apr. 29, 2025

(54) METHOD FOR LOCATING POSITION OF OBSTACLES, AND APPARATUS, AND SYSTEM APPLYING METHOD

(71) Applicant: HON HAI PRECISION INDUSTRY CO., LTD., New Taipei (TW)

(72) Inventors: Yueh Chang, New Taipei (TW); Chin-Pin Kuo, New Taipei (TW); Guo-Chin Sun, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 840 days.

(21) Appl. No.: 17/523,987

(22) Filed: Nov. 11, 2021

(65) Prior Publication Data
US 2022/0164978 A1 May 26, 2022

(30) Foreign Application Priority Data
Nov. 24, 2020 (CN) .......................... 202011335232.4

(51) Int. Cl.
 *G06K 9/36* (2006.01)
 *G06F 18/21* (2023.01)
 (Continued)

(52) U.S. Cl.
 CPC ............ *G06T 7/70* (2017.01); *G06F 18/2163* (2023.01); *G06F 18/241* (2023.01); *G06T 7/10* (2017.01);
 (Continued)

(58) Field of Classification Search
 CPC ........ G06V 10/20; G06V 10/22; G06V 10/23; G06V 10/25; G06V 10/26; G06V 10/40; G06V 10/44; G06V 10/50; G06V 10/70; G06V 10/72; G06V 10/74; G06V 10/75; G06V 10/751; G06V 10/764; G06V 10/768; G06V 10/82; G06V 20/40; G06V 20/41; G06V 20/50; G06V 20/52; G06V 20/54; G06V 20/58; G06V 20/60; G06V 20/64;
 (Continued)

(56) References Cited

U.S. PATENT DOCUMENTS 10,528,815 B2 * 1/2020 Maheriya ............. G06V 20/653
10,809,079 B2 * 10/2020 Bell ........................ G06F 3/011
(Continued)

FOREIGN PATENT DOCUMENTS

| CN | 103413308 A | 11/2013 |
|---|---|---|
| CN | 104268836 A | 1/2015 |
| KR | 20180058624 A | 6/2018 |

*Primary Examiner* — Eric Rush
(74) *Attorney, Agent, or Firm* — ScienBiziP, P.C.

(57) ABSTRACT

For the benefit of pedestrians, a method for identifying and locating positions of obstacles moving on a pedestrian sidewalk acquires an image of the sidewalk and processes the image to divide it. The divided image comprises classifications of objects in the image on a pixel by pixel basis. The classifying of objects in the divided image comprises the sidewalk classification, and classification of the obstacles appears in the image. Pixels surrounding the obstacles are acquired in terms of number and classifications. Positions of the obstacles are determined based on a preset threshold, the classifications of adjacent pixels of the obstacles, and the pixel number of the adjacent pixel in each object classification. An apparatus and a system applying the method are also disclosed.

20 Claims, 8 Drawing Sheets (51) Int. Cl.

| | |
|---|---|
| *G06F 18/241* | (2023.01) |
| *G06T 7/10* | (2017.01) |
| *G06T 7/70* | (2017.01) |
| *G06V 10/22* | (2022.01) |
| *G06V 10/26* | (2022.01) |
| *G06V 10/70* | (2022.01) |
| *G06V 20/50* | (2022.01) |
| *G06V 20/58* | (2022.01) |
| *G06V 20/70* | (2022.01) |

(52) U.S. Cl.
CPC .............. *G06V 10/22* (2022.01); *G06V 10/26* (2022.01); *G06V 10/768* (2022.01); *G06V 20/50* (2022.01); *G06V 20/58* (2022.01); *G06V 20/70* (2022.01)

(58) Field of Classification Search
CPC ...... G06V 20/70; G06V 2201/07; G06T 7/00; G06T 7/10; G06T 7/70; G06T 7/73; G06T 7/77; G06T 2207/20021; G06T 2207/20084; G06T 2207/30184; G06T 2207/30261; G06F 18/20; G06F 18/21; G06F 18/213; G06F 18/2163; G06F 18/24; G06F 18/241; G06F 18/30
USPC ....... 382/100, 103, 104, 114, 153, 154, 159, 382/164, 165, 173, 180, 181, 190, 192, 382/195, 199, 224, 228, 282, 291; 340/435–437; 348/61, 62, 113, 115, 116, 348/119, 135, 169–172; 701/300, 301
See application file for complete search history.

(56) References Cited

U.S. PATENT DOCUMENTS 10,846,817 B2 * 11/2020 Kanzawa ............... G06V 20/56
2007/0291288 A1   12/2007 Campbell et al.

* cited by examiner

METHOD FOR LOCATING POSITION OF OBSTACLES, AND APPARATUS, AND SYSTEM APPLYING METHOD

FIELD

The subject matter herein generally relates to pedestrian safety.

BACKGROUND

Pedestrian safety along roadways is always a concern, and mobile two-wheelers and tricycles can be both a source of danger and an obstacle to pedestrians. Cities often provide a bicycle lane and a lane for the blind in a sidewalk, and many bicycles traverse these paths. To an aged person and the visually-impaired, walking along the sidewalk can be very intimidating.

Thus, there is room for improvement in the art.

BRIEF DESCRIPTION OF THE FIGURES

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
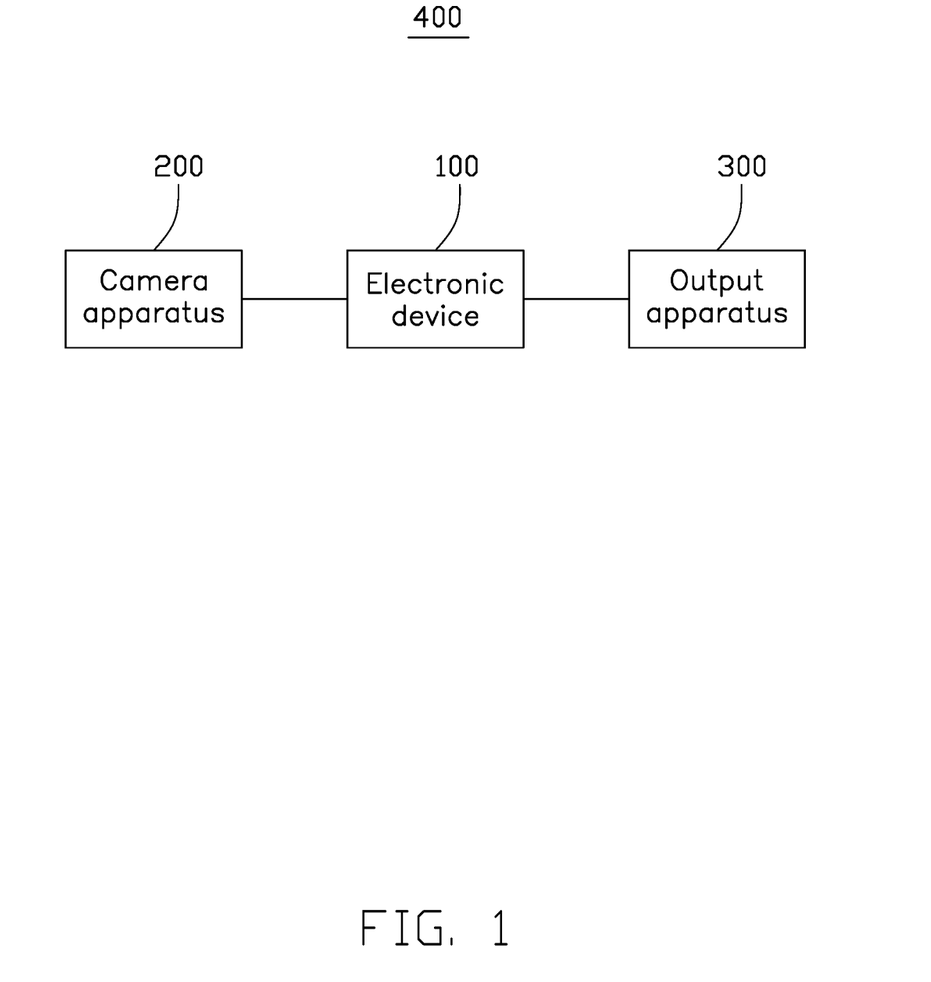
FIG. 1 is a diagram illustrating an embodiment of a system for locating positions of obstacles, the system includes an electronic device.

FIG. 1 shows a system 400 for locating positions along a sidewalk of obstacles, such as two and three-wheeled vehicles and permanent or temporary fixtures and obstacles such as lamp-posts and plastic barriers (hereinafter altogether included in term "obstacles"). The system 400 includes an electronic device 100, a camera apparatus 200, and an output apparatus 300.

The camera 200 captures an image of a sidewalk.

In one embodiment, the camera apparatus 200 can be a camera. The camera periodically captures the image of scene in front of the camera, a time interval for capturing the image is in a range from 1 millisecond to 200 milliseconds. The captured image is sent to the electronic device 100.

The electronic device 100 processes the image to locate positions of the obstacle.

Figure 2:
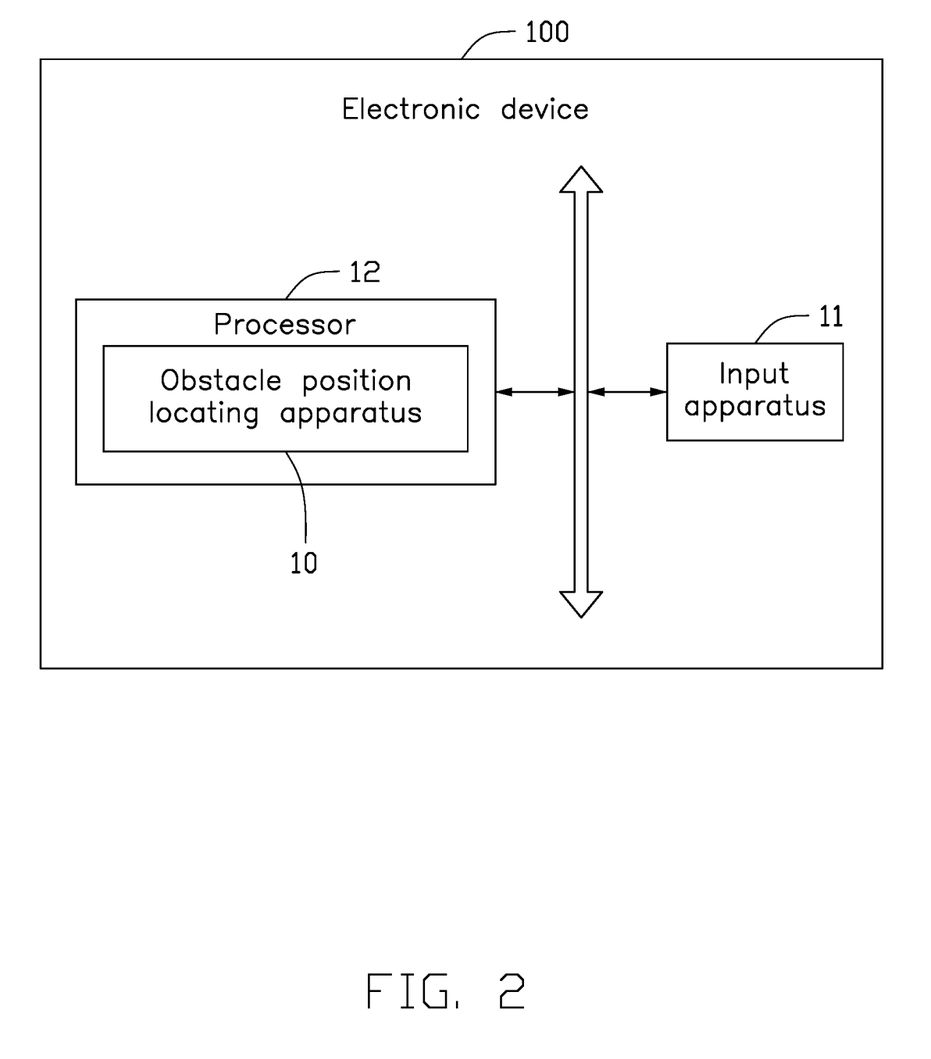
FIG. 2 is a diagram illustrating an embodiment of the electronic device of FIG. 1.

Referring to FIG. 2, an obstacle position locating apparatus 10 is implemented in the electronic device 100. The electronic device 100 includes an input apparatus 11 and at least one processor 12, not being limited thereto. The foregoing elements are connected through a communication bus.

FIG. 2 merely is an example of the electronic device 100. In other embodiments, the electronic device 100 can include more or less elements, or have different elements. Such electronic device 100 can includes an Internet of Things or Internet terminal or device, such as a mobile phone, a smart watch, a wearable device, and so on.

In one embodiment, the input apparatus 11 is configured to capture the image of the scene. The obstacle position locating apparatus 10 is connected with the input apparatus 11 and the obstacle position locating apparatus 10 processes the image outputted by the input apparatus 11. The processor 12 is connected with the input apparatus 11 for processing the inputted image.

In one embodiment, the obstacle position locating apparatus 10 can be a client or a plug-in device. The client can include at least one application program, and can be executed in the electronic device 100 for implementing a method for locating positions of obstacles. The plug-in can be activated by the electronic device 100 for implementing the method for locating positions of the obstacles.

The output apparatus 300 is configured to output respective positions of the obstacles.

In one embodiment, the output apparatus 300 can include an audio player and a display, for outputting an audio or a video of the positions of obstacles confirmed by the obstacle position locating apparatus 10, therefore, users can plans a path based on the positions of obstacles outputted by the output apparatus 300 for avoiding safety hazards.

The output apparatus 300 can output a suitable planned path based on the obstacle positions for navigating.

The electronic device 100, the camera 200, and the output apparatus 300 in the system 400 for locating positions of the obstacles can be embedded or separately disposed. For example, when the electronic device 100 is a wearable device, the wearable device can include a camera and an audio player. When the user with the wearable device walks on the sidewalk, the camera captures an image of the sidewalk in front of the users, and the captured image is provided to the obstacles position locating apparatus 10 through the input apparatus 11. The obstacle position locating apparatus 10 processes the captured image and outputs positions of the obstacles to the audio player, and the audio player plays audio of such positions to the users.

Figure 3:
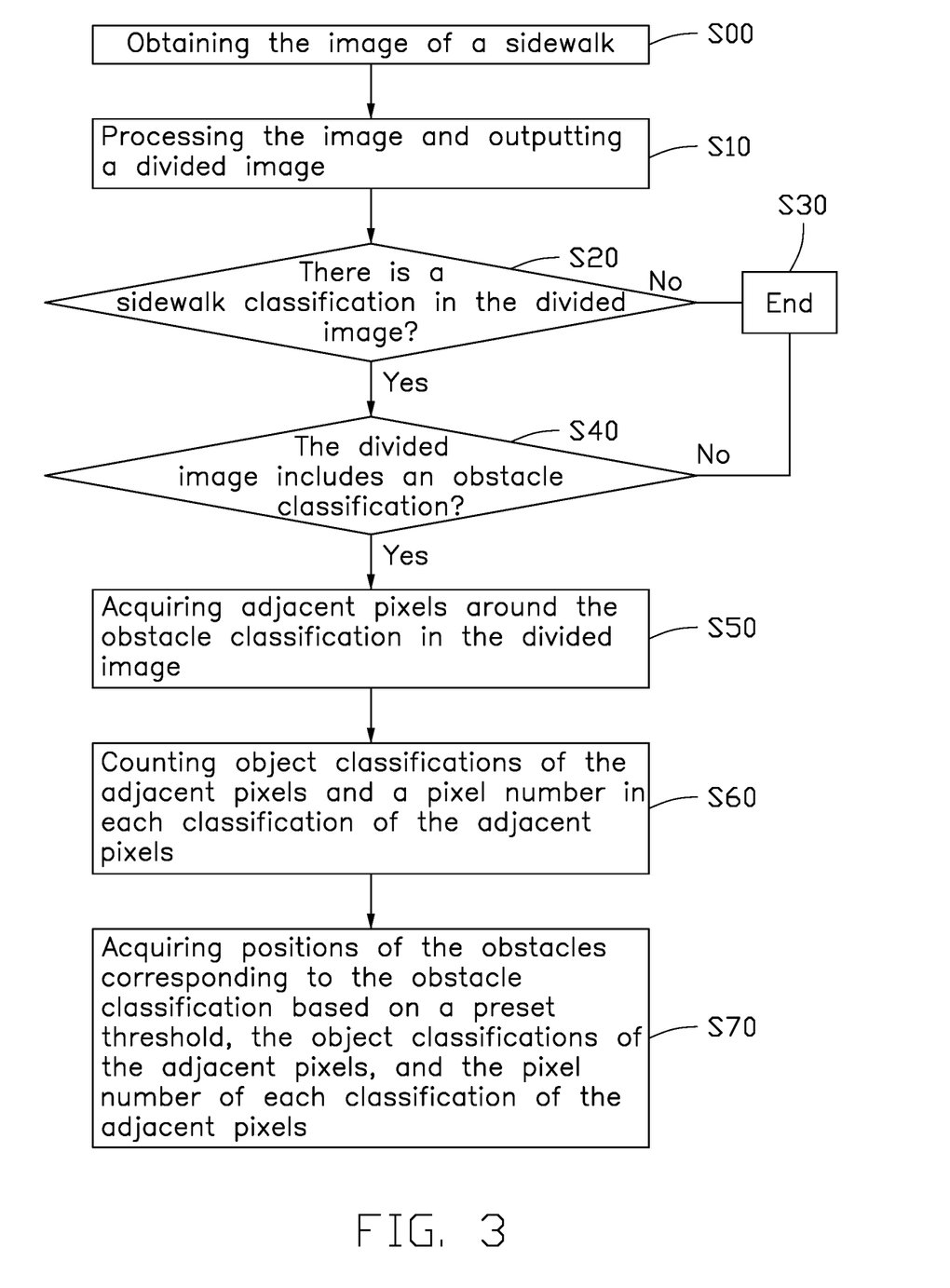
FIG. 3 is a flowchart illustrating an embodiment of a method for locating positions of obstacles.

FIG. 3 shows a flowchart of the method of locating positions of obstacles. The method may comprise at least the following steps, which also may be re-ordered:

In block S00, obtaining image of the sidewalk.

In one embodiment, the image can be an original image captured by a camera, or a processed image, not being limited thereto.

In block S10, processing the image and outputting a divided image.

The divided image includes several object classifications corresponding to each pixel in the image.

In one embodiment, the processing of the image includes a pre-processing operation and a semantic image segmentation operation, or the processing operation of the image may only include the semantic image segmentation operation.

Figure 4:
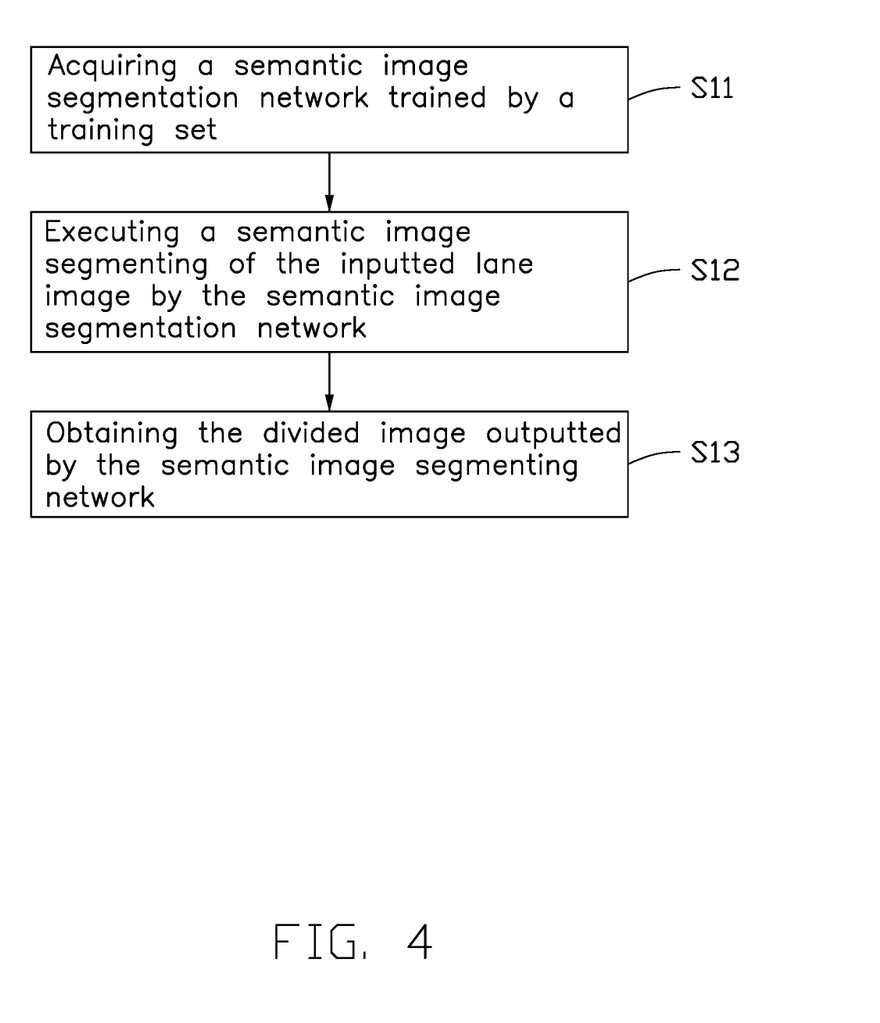
FIG. 4 is a detailed flowchart illustrating an embodiment of block S10 in FIG. 3.

Referring to FIG. 4, the step S10 of processing the image and outputting a divided image further includes the following steps:

In block S11, acquiring a semantic image segmentation network trained by a training set.

The training set include training images with label information.

In one embodiment, the semantic image segmentation network extracts feature and segments objects. The network for extracting features can include a Visual Geometry Group Network (VGG) model, a Mobilenet, and a Resnet, not being limited. The network for segmenting objects can include a Fully Convolutional Networks, a Fully Connected/Dense CRF, not being limited. By the operations of the two types of networks, different objects in the image are segmented. By training the semantic image segmentation network with a training set and a test set, a trained semantic image segmentation network is obtained.

In one embodiment, the training images with label information in the training set are the images with labels manually applied. The obstacles along a sidewalk to a user's straight-line path are labeled, these may include bicycles, motorbikes, and tricycles. The sidewalk in the image is itself labeled as a sidewalk object, the lane or lanes in the image is or are labeled as traffic lane object, and the remainder of the sidewalk outside the traffic lane object is labeled as a middle lane object.

In block S12, executing a semantic image segmenting of the inputted image by the semantic image segmentation network.

In one embodiment, the semantic image segmenting operation identifies objects in image by pixels. Object classifications by pixel of the image are labeled for forecasting category labels.

The image can be an RGB image or a gray-scale image. The RGB image or the gray-scale image is inputted into the semantic image segmenting network to output the divided image. The divided image includes an object classification of each pixel in the image, such as label 1 representing a sidewalk classification corresponding to the sidewalk object, label 2 representing a middle lane classification corresponding to the middle lane object, label 3 representing a traffic lane classification corresponding to the traffic lane object, and label 4 representing an obstacle classification corresponding to the obstacle.

In block S13, obtaining the divided image outputted by the semantic image segmenting network.

Figure 5:
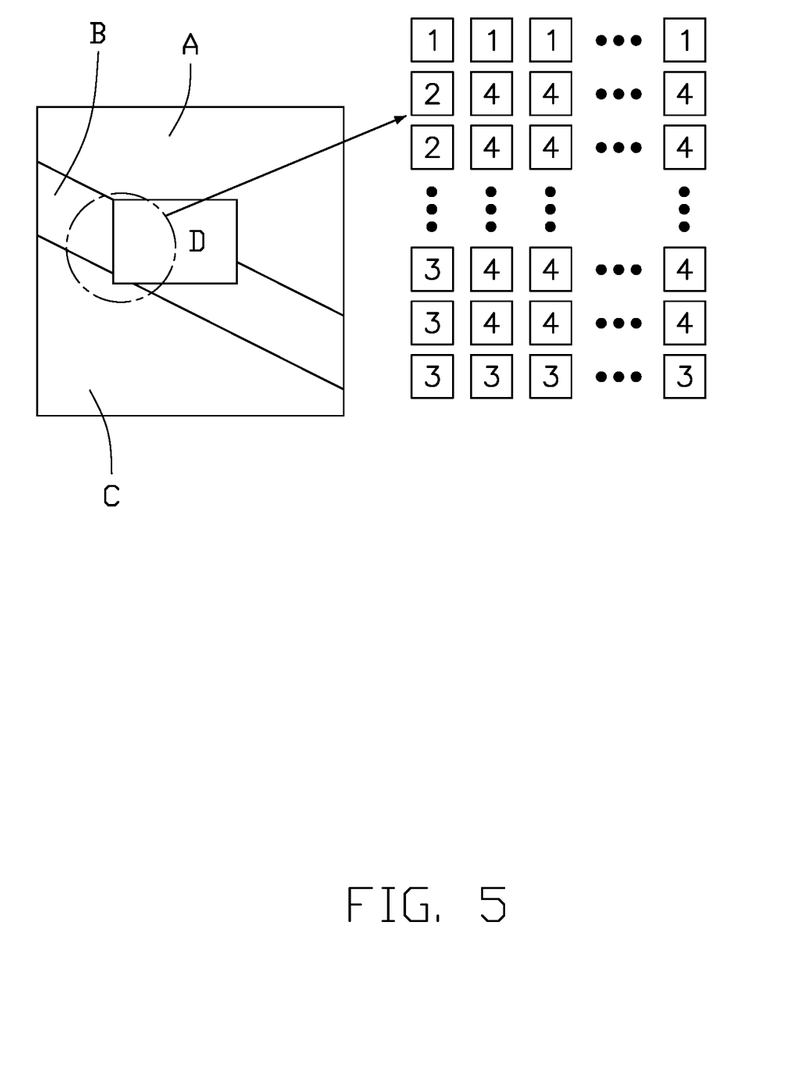
FIG. 5 is a diagram illustrating an embodiment of a divided image.

For example, as shown in FIG. 5, the divided image includes the object classification labels of each pixel in the image. Region A corresponds to a sidewalk classification, and includes the label 1. Region B corresponds to a middle lane classification, and includes the label 2. Region C corresponds to a traffic lane classification, and includes the label 3. Region D corresponds to the obstacle classification, and includes the label 4.

In block S20, whether there is a sidewalk classification in the divided image is determined.

When the divided image includes the sidewalk classification, the procedure goes to the block S40. If the divided image does not include the sidewalk classification, the procedure goes to block S30, and the procedure ends.

In one embodiment, whether the classifications in the divided image include the sidewalk classification is determined, and based on that, the existence or non-existence of a suitable region for pedestrians is determined.

It is understood that the purpose of the present disclosure is to assist pedestrians making their way on the sidewalk. If there is no sidewalk, there is an overall safety hazard for aged persons and the visually-impaired when walking, and the disclosed method for locating positions of the obstacles provides no assistance, thus the procedure ends.

In block S40, whether the divided image include the obstacle classification is determined.

When the divided image includes the obstacle classification, the procedure goes to the block S60. When the divided image does not include the obstacle classification, the procedure goes to the block S30, and the procedure ends.

In one embodiment, when there is an available sidewalk for the pedestrian, the existence or non-existence of the obstacles is determined for acquiring an operation of continued walking. The following steps are used for locating positions of the obstacles for improved accuracy.

When there is no obstacle, such a determining result is outputted to the user, therefore the pedestrian can continue walking.

In block S50, acquiring adjacent pixels around the obstacle in the divided image.

Figure 6:
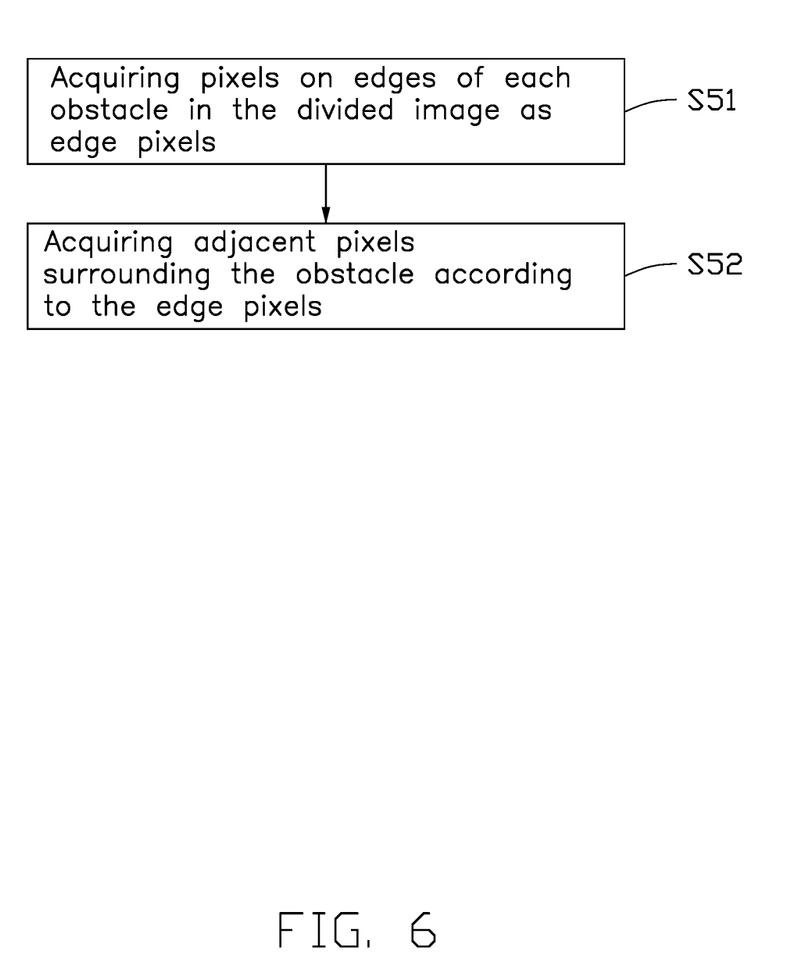
FIG. 6 is a detailed flowchart illustrating block S50 in FIG. 3.

In one embodiment, as shown in FIG. 6, the step of acquiring adjacent pixels around the obstacle in the divided image includes the following steps.

In block S51, acquiring pixels on edges of each obstacle in the divided image as edge pixels.

In one embodiment, one of the edge pixels of each obstacle is confirmed as a start point, and remainder of the edge pixels of each obstacle are acquired from the start point. The start points can be acquired as follows. A left corner pixel of the image is set as an origin, distances between the origin and the edge pixels of the obstacle are calculated, and a minimum distance is set as the start point of the obstacle.

The adjacent pixels of the obstacle correspond to different classifications. Referring to FIG. 5, the label 4 corresponds to the obstacle classification. Pixels corresponding to other labels, such as the label 1, the label 2, or the label 3, which are adjacent to the label 4, are the edge pixels of the obstacle.

In block S52, acquiring adjacent pixels surrounding the obstacle according to the edge pixels.

In one embodiment, after acquiring the edge pixels of the obstacle, the adjacent pixels are acquired, and the pixels peripheral the obstacle are set as the adjacent pixels surrounding the obstacle.

In one embodiment, object classifications of the adjacent pixels include a sidewalk classification corresponding to the sidewalk object and/or a traffic lane classification corresponding to the traffic lane, and/or a middle lane classification corresponding to the middle lane. The middle lane classification includes a classification corresponding to the middle lane between the traffic lane object and the sidewalk object.

For example, as shown in FIG. 5, the label 1, the label 2, and the label 3, which are adjacent to the label 4, are the labels of the adjacent pixels. A first pixel adjacent to the edge pixels of the obstacle is set as the adjacent pixels.

In block S60, counting a number of pixels of the adjacent pixels corresponding to each object classification of the object classifications to determine a number of pixels in each classification of the adjacent pixels.

In one embodiment, when the object classifications of the adjacent pixels are composed by the sidewalk classification, the number of pixels of the sidewalk classification of the adjacent pixels are acquired.

In one embodiment, when the object classifications of the adjacent pixels are composed by the traffic lane classification, the number of pixels of the traffic lane classification of the adjacent pixels are acquired.

In one embodiment, when the object classifications of the adjacent pixels are composed by the middle lane classification, the number of pixels of the middle lane classification of the adjacent pixels are acquired.

In one embodiment, when the object classifications of the adjacent pixels are composed by the sidewalk classification and the traffic lane classification, the number of pixels of the sidewalk classification and the traffic lane classification of the adjacent pixels are acquired.

In one embodiment, when the object classifications of the adjacent pixels are composed by the sidewalk classification and the middle lane classification, the number of pixels of the sidewalk classification and the middle lane classification of the adjacent pixels are acquired.

In one embodiment, when the object classifications of the adjacent pixels are composed by the traffic lane classification and the middle lane classification, the number of pixels of the traffic lane classification and the middle lane classification of the adjacent pixels are acquired.

In one embodiment, when the object classifications of the adjacent pixels are composed by the sidewalk classification, the traffic lane classification, and the middle lane classification, the number of pixels of the sidewalk classification, the traffic lane classification, and the middle lane classification of the adjacent pixels are acquired.

In block S70, acquiring the position of the obstacle corresponding to the obstacle classification based on a preset threshold, the object classifications of the adjacent pixels, and the number of pixels of each classification of the adjacent pixels.

In one embodiment, the step of acquiring the position of the obstacle corresponding to the obstacle classification based on the preset threshold, the object classifications of the adjacent pixels, and the number of pixels of each classification of the adjacent pixels can further include the following steps.

When the object classifications of the adjacent pixels include the traffic lane classification, whether the number of pixels of the adjacent pixels reaches the preset threshold is determined. When the number of pixels of the adjacent pixels reaches the preset threshold, the position of the obstacle does not include the sidewalk object. And/or when the object classifications of the adjacent pixels include the middle lane classification, whether the number of pixels of the adjacent pixels reaches the preset threshold is determined. When the number of pixels of the adjacent pixels reaches the preset threshold, the position of the obstacle does not include the sidewalk object.

Figure 7:
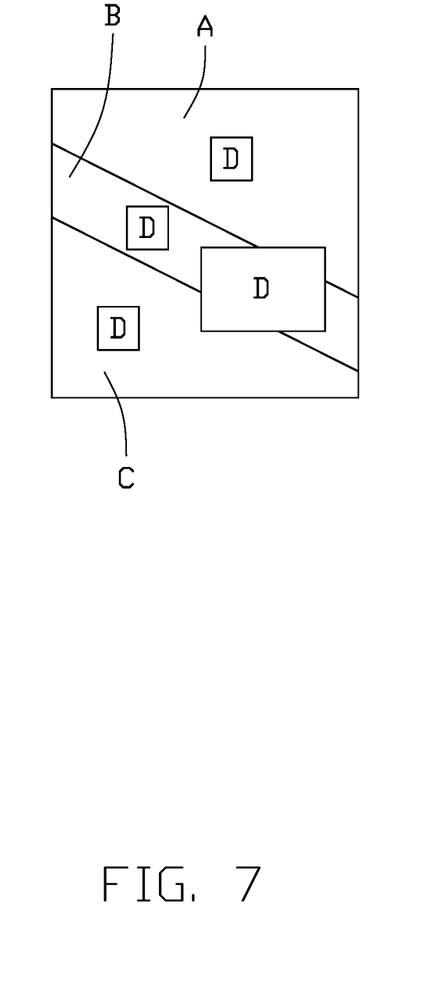
FIG. 7 is a diagram illustrating an embodiment of a position of the obstacle in a lane.

Referring to FIG. 7, the positions of the obstacles can include one or any combination of the sidewalk, the traffic lane, and the middle lane.

In one embodiment, whether the positions of the obstacles are in the sidewalk is determined. When the positions of the obstacles are in the sidewalk, a warning prompt needs to be provided to the president. When the positions of the obstacles are out of the sidewalk, there is no need to provide the warning prompt. By determining the positions of the obstacles are in or out of the sidewalk, an accuracy of the output result is improved.

In one embodiment, when the number of pixels of the traffic lane classification and/or the middle lane classification reaches the preset threshold, the position of the obstacle is out of the sidewalk, the determining result can be that the position of the obstacle is out of the sidewalk or the specific position of the obstacle on the traffic lane or on the middle lane are outputted.

In one embodiment, when the object classifications of the adjacent pixels are composed by the traffic lane classification, whether the number of pixels of the adjacent pixels corresponding to the traffic lane classification reaches the preset threshold is determined. The preset threshold contains a number of pixels of the adjacent pixels. When the number of pixels of the adjacent pixels reaches the preset threshold, the position of the obstacle does not include the sidewalk objects, and is the traffic lane.

In one embodiment, when the object classifications of the adjacent pixels are composed by the middle lane classification, whether the number of pixels of the adjacent pixels corresponding to the middle lane classification reaches the preset threshold is determined. The preset threshold includes a number of pixels of the adjacent pixels. When the number of pixels of the adjacent pixels reaches the preset threshold, the position of the obstacle does not include the sidewalk objects, and is the middle lane.

In one embodiment, the step of acquiring the position of the obstacle corresponding to the obstacle classification based on the preset threshold, the object classifications of the adjacent pixels, and the number of pixels of each classification of the adjacent pixels can further include the following steps.

When the object classifications of the adjacent pixels include the sidewalk classification, acquiring the preset threshold, the preset threshold contains a number of pixels of the adjacent pixels. Whether the number of pixels of the adjacent pixels corresponding to the sidewalk classification reaches the preset threshold is determined. When the number of pixels of the adjacent pixels corresponding to the sidewalk classification reaches the preset threshold, the position of the obstacle includes the sidewalk object.

In one embodiment, when the object classifications of the adjacent pixels are composed by the sidewalk classification, it is determined that the positions of the obstacles are the sidewalk, and an accuracy is improved.

In one embodiment, the object classifications of the adjacent pixels are composed by the sidewalk classification and the traffic lane classification, or the sidewalk classification and the middle lane classification, or the sidewalk classification, the traffic lane classification, and the middle lane classification, whether the number of pixels of the adjacent pixels corresponding to different classifications respectively reaches the preset threshold are determined. When the number of pixels of the adjacent pixels corresponding to any one of the object classifications reaches the preset threshold, the position of the obstacle is confirmed by the one of the object classifications. When the number of pixels of the adjacent pixels corresponding to two or three object classifications reaches the preset threshold, the positions of the obstacles are confirmed by the two or three of the object classifications.

In one embodiment, the object classifications of the adjacent pixels may not be adjacent to each other, such as when the number of pixels of the adjacent pixels corresponding to the sidewalk classification and the number of pixels of the adjacent pixels corresponding to the traffic lane classification reach the preset threshold respectively, whether the middle lane classification exists in the image is determined. When the middle lane classification exists in the image, positions of the obstacles include the sidewalk, the traffic lane, and the middle lane. In another example, the middle lane classification exists in the image, a maximum number of pixels of the adjacent pixels corresponding to the sidewalk classification and the number of pixels of the adjacent pixels corresponding to the traffic lane classification is determined, the positions corresponding to the maximum number of pixels are set as the positions of the obstacles. When the middle lane classification does not exist in the image, the positions of the obstacles include the sidewalk and the traffic lane.

In one embodiment, before the step S70, the method of locating the positions of the obstacles can further include the following steps.

The preset threshold corresponding to a state information of the obstacle classification in the divided image are acquired. The state information can include shapes and/or sizes of the obstacles.

It is understood that, when the obstacle occupies most area in the image, the preset threshold can be bigger, thus a probability of meeting the preset threshold is reduced. A value of the preset threshold can be set due to an actual situation, not being limited.

In one embodiment, the confirmed positions of the obstacles are outputted in the audio manner or in the image manner, and also can output to a controller, and the controller controls the electronic device 100 to control a walk state of the user.

Figure 8:
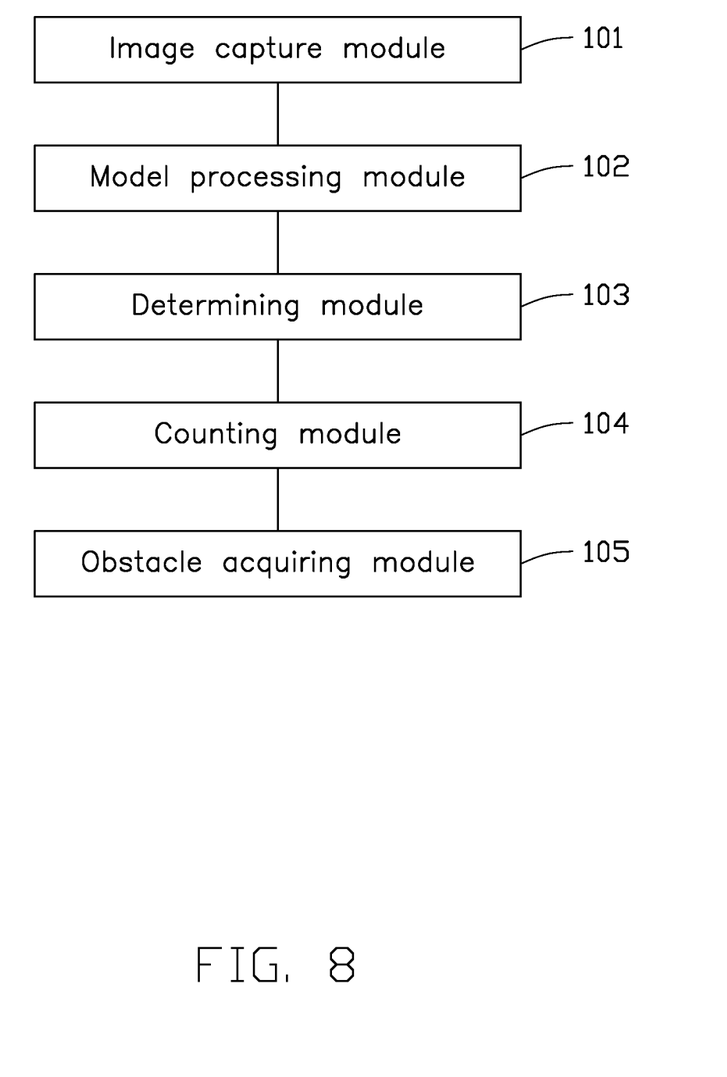
FIG. 8 is a diagram illustrating an embodiment of an apparatus for locating obstacles.

Referring to FIG. 8, FIG. 8 shows an obstacle position locating apparatus 10. The obstacle position locating apparatus 10 includes:

An image capture module 101, configured to acquire an image.

A model processing module 102, configured to process the image and output a divided image. The divided image includes object classifications of each pixel in the image.

A determining module 103, configured to determine whether the object classification of the divided image include the sidewalk classification. When the object classifications of the divided image include the sidewalk classification, the adjacent pixels surrounding the obstacle in the divided image is confirmed.

A counting module 104, configured to count a number of pixels of the adjacent pixels corresponding to each object classification of the object classifications to determine a number of pixels of the adjacent pixels in each object classification.

An obstacle acquiring module 105, configured to acquire the position of the obstacle based on the preset threshold, the object classifications of the adjacent pixels, and the number of pixels of the adjacent pixels in each object classification.

The obstacle position locating method, an apparatus, an electronic device, and a system of the present disclosure, firstly acquires an image, processes the image, and output a divided image. The divided image includes object classifications of each pixel in the image. Whether the object classifications of the divided image include a sidewalk classification is determined. When the object classifications of the divided image include the sidewalk classification, whether the object classifications of the divided image include an obstacle classification is determined. When the object classifications of the divided image include the obstacle classification, a number of the object classifications of the adjacent pixels are counted and a number of pixels of the adjacent pixels in each object classification are counted. The positions of the obstacles are confirmed based on the preset threshold, the number of the object classifications of the adjacent pixels, and the number of pixels of each object classification. Whether an obstacle is on the sidewalk is determined for accurately determining positions of the obstacles, and it can assist the pedestrian while walking.

In one embodiment, the processor 12 can be a central processing unit (CPU), and also can be other general processor, a digital signal processor (DSP), an application specific integrated circuit (ASIC), a field-programmable gate array (FPGA), or other programmable logic devices, discrete gates or transistor logic devices, discrete hardware, and so on. The general processor can be a microprocessor, and the processor 12 can be other type regular processor.

When the modules in the obstacle position locating apparatus 10 can be stored in a computer readable storage medium being implemented in software manner while product selling or using. It is understood that, the whole steps or parts of the method of the present disclosure is implemented by computer instructions of the computer programs executed by related hardware. The computer programs are stored in the computer readable storage medium. The computer programs are executed by the processor to implement the steps of the method of the present disclosure. The computer programs can include computer codes. The computer codes can be source codes, object codes, files, or executable file, or in some intermediate form, and so on. The computer readable storage medium can include any entity or device with the computer programs, a recording medium, a USB disk, a removable hard disk, a disk, an optical disk, a computer storage, a read-only memory (RAM), a random access memory (RAM), an electrical carrier signal, an electrical signal, a software distribution medium, and so one. It needs to explained that, the contents of the computer readable storage medium can be added or reduced according to a legislation and a patent practice, such as in some jurisdictions, according to the legislation and the patent practice, the computer readable storage medium does not include electrical carrier signals and electrical signals.

It is understood that, the modules are divided in a logic function manner, and there can be other divided manner to achieve the functions of the modules. The modules in the present disclosure can be embedded in one processor unit, and also can be a single physical presence, and also can be at least two modules embedded in one module. The embedded module can be achieved by hardware manner or by a combination of hardware and software manner.

In one embodiment, the electronic device 100 also can include a storage (not shown). One or more modules are stored in the storage, and are executed by the processor 12. The storage can be an internal storage of the electronic device 100, embedded in the electronic device 100. In other embodiments the storage can be an external storage connected with the electronic device 100.

In some embodiments, the storage stores program codes and different types of data, such as the program codes of the obstacle position locating apparatus 10 in the electronic device 100. The storage can automatically access the program and the data at a high speed.

The storage medium can include a random access medium, and also can be a nonvolatile storage medium, such as a hard disk, a memory, a plug-in hard disk, a smart media card (SMC), a secure digital (SD), a flash card, at least one disk device, a flash device, or other volatile solid storage medium.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A method for locating a position of an obstacle applied on an obstacle position locating apparatus, the obstacle position locating apparatus comprises a processor and a storage; the processor executes program codes stored in the storage to implement the following steps:
   acquiring an image of a sidewalk;
   processing the image and outputting a divided image; the divided image comprises object classifications of each pixel in the image;
   determining whether the object classifications in the divided image comprise a sidewalk classification;
   when the object classifications in the divided image comprise the sidewalk classification, determining whether the object classifications in the divided image comprise an obstacle classification;
   when the object classifications in the divided image comprise the obstacle classification, acquiring adjacent pixels surrounding the obstacle classification;
   counting a number of pixels of the adjacent pixels corresponding to each object classification of the object classifications to determine the number of pixels of the adjacent pixels in each object classification of the object classifications; and
   acquiring the position of the obstacle corresponding to the obstacle classification based on a preset threshold, the object classifications of the adjacent pixels, and the number of pixels of the adjacent pixels in each object classification.

2. The method of claim 1, wherein the object classifications of the adjacent pixels comprise a sidewalk classification corresponding to a sidewalk object and/or a traffic lane classification corresponding to a traffic lane object, and/or a middle lane classification corresponding to a middle lane object; the middle lane classification comprises classifications corresponding to middle lane objects between the sidewalk object and the traffic lane object.

3. The method of claim 2, wherein before the step of acquiring the position of the obstacle corresponding to the obstacle classification based on the preset threshold, the object classifications of the adjacent pixels, and the number of pixels of the adjacent pixels in each object classification, the method further comprising:
   acquiring the preset threshold based on a state information of the obstacle classification in the divided image; the state information comprises a shape and/or a size of the obstacle.

4. The method of claim 3, wherein the step of acquiring the position of the obstacle corresponding to the obstacle classification based on the preset threshold, the object classifications of the adjacent pixels, and the number of pixels of the adjacent pixels in each object classification comprises:
   when the object classifications of the adjacent pixels comprise the traffic lane classification, determining whether the number of pixels of the adjacent pixels corresponding to the traffic lane classification reaches the preset threshold;
   when the number of pixels of the adjacent pixels corresponding to the traffic lane classification reaches the preset threshold, the position of the obstacle does not comprise the sidewalk object;
   and/or
   when the object classifications of the adjacent pixels comprise the middle lane classification, determining whether the number of pixels of the adjacent pixels corresponding to the middle lane classification reaches the preset threshold; and
   when the number of pixels of the adjacent pixels corresponding to the middle lane classification reaches the preset threshold, the position of the obstacle does not comprise the sidewalk object.

5. The method of claim 2, wherein the step of acquiring the adjacent pixels surrounding the obstacle classification comprises:
   acquiring pixels on edges of the obstacle in the divided image as edge pixels; and
   acquiring the adjacent pixels surrounding the obstacle classification based on the edge pixels of the obstacle.

6. The method of claim 2, wherein the step of processing the image and outputting the divided image comprises:
   acquiring a semantic image segmentation network based on a training set; the training set comprises images with label information;
   executing a semantic image segmenting of the image of the sidewalk by the semantic image segmentation network; and
   obtaining the divided image outputted by the semantic image segmentation network.

7. The method of claim 1, wherein the step of acquiring the position of the obstacle corresponding to the obstacle classification based on the preset threshold, the object classifications of the adjacent pixels, and the number of pixels of the adjacent pixels in each object classification comprises:
   when the object classifications of the adjacent pixels comprise the sidewalk classification, acquiring the preset threshold; the preset threshold contains the number of pixels of the adjacent pixels;
   determining whether the number of pixels of the adjacent pixels corresponding to the sidewalk classification reaches the preset threshold; and
   when the number of pixels of the adjacent pixels corresponding to the sidewalk classification reaches the preset threshold, the position of the obstacle comprises a sidewalk object.

8. An obstacle position locating apparatus, the obstacle position locating apparatus comprising:
  a processor; and
  a storage, configured to store program codes being executed by the processor; the storage comprising:
  an image capture module, configured to acquire an image of a sidewalk;
  a model processing module, configured to process the image and output a divided image; the divided image comprises object classifications of each pixel in the image;
  a determining module, configured to determine whether the object classifications in the divided image comprise a sidewalk classification; when the object classifications of the divided image include the sidewalk classification, the determining module further determines whether the object classifications in the divided image comprise an obstacle classification; when the object classifications in the divided image comprise the obstacle classification, the determining module confirms adjacent pixels surrounding the object classification in the divided image;
  a counting module, configured to count a number of pixels of the adjacent pixels corresponding to each object classification of the object classifications to determine the number of pixels of the adjacent pixels in each object classification; and
  an obstacle acquiring module, configured to acquire a position of an obstacle based on a preset threshold, the object classifications of the adjacent pixels, and the number of pixels of the adjacent pixels in each object classification.

9. The obstacle position locating apparatus of claim 8, wherein the object classifications of the adjacent pixels comprise a sidewalk classification corresponding to a sidewalk object and/or a traffic lane classification corresponding to a traffic lane object, and/or a middle lane classification corresponding to a middle lane object; the middle lane classification comprises classifications corresponding to middle lane objects between the sidewalk object and the traffic lane object.

10. The obstacle position locating apparatus of claim 9, the obstacle acquiring module further acquires the preset threshold based on a state information of the obstacle classification in the divided image; the state information comprises a shape and/or a size of the obstacle.

11. The obstacle position locating apparatus of claim 10, wherein when the object classifications of the adjacent pixels comprise the traffic lane classification, the obstacle acquiring module further determines whether the number of pixels of the adjacent pixels corresponding to the traffic lane classification reaches the preset threshold; when the number of pixels of the adjacent pixels corresponding to the traffic lane classification reaches the preset threshold, the position of the obstacle does not comprise the sidewalk object; and/or when the object classifications of the adjacent pixels comprise the middle lane classification, the obstacle acquiring module further determines whether the number of pixels of the adjacent pixels corresponding to the middle lane classification reaches the preset threshold; when the number of pixels of the adjacent pixels corresponding to the middle lane classification reaches the preset threshold, the position of the obstacle does not comprise the sidewalk object.

12. The obstacle position locating apparatus of claim 10, wherein the model processing module further executes semantic image segmenting of the image of the sidewalk by a semantic image segmentation network, and obtains the divided image outputted by the semantic image segmentation network.

13. The obstacle position locating apparatus of claim 9, wherein the determining module further acquires pixels on edges of the obstacle in the divided image as edge pixels, and confirms the adjacent pixels surrounding the obstacle classification based on the edge pixels of the obstacle.

14. The obstacle position locating apparatus of claim 8, wherein when the object classifications of the adjacent pixels comprise the sidewalk classification, the obstacle acquiring module acquires the preset threshold; the preset threshold contains the number of pixels of the adjacent pixels; the obstacle acquiring module further determines whether the number of pixels of the adjacent pixels corresponding to the sidewalk classification reaches the preset threshold; when the number of pixels of the adjacent pixels corresponding to the sidewalk classification reaches the preset threshold, the position of the obstacle comprises a sidewalk object.

15. A system for locating positions of obstacles comprises a camera apparatus, an output apparatus, and an electronic device; the electronic device comprises at least one processor; the at least one processor executes at least one program to implement the following steps:
  acquiring an image of a sidewalk;
  processing the image and outputting a divided image; the divided image comprises object classifications of each pixel in the image;
  determining whether the object classifications in the divided image comprise a sidewalk classification;
  when the object classifications in the divided image comprise the sidewalk classification, determining whether the object classifications in the divided image comprise an obstacle classification;
  when the object classifications in the divided image comprise the obstacle classification, acquiring adjacent pixels surrounding the obstacle classification;
  counting a number of pixels of the adjacent pixels corresponding to each object classification of the object classifications to determine the number of pixels of the adjacent pixels in each object classification; and
  acquiring the position of an obstacle corresponding to the obstacle classification based on a preset threshold, the object classifications of the adjacent pixels, and the number of pixels of the adjacent pixels in each object classification.

16. The system of claim 15, wherein the object classifications of the adjacent pixels comprise a sidewalk classification corresponding to a sidewalk object and/or a traffic lane classification corresponding to a traffic lane object, and/or a middle lane classification corresponding to a middle lane object; the middle lane classification comprises classifications corresponding to middle lane objects between the sidewalk object and the traffic lane object.

17. The system of claim 16, wherein before the step of acquiring the position of the obstacle corresponding to the obstacle classification based on the preset threshold, the object classifications of the adjacent pixels, and the number of pixels of the adjacent pixels in each object classification, further:
  acquiring the preset threshold based on a state information of the obstacle classification in the divided image; the state information comprises a shape and/or a size of the obstacle.

18. The system of claim 17, wherein the step of acquiring the position of the obstacle corresponding to the obstacle classification based on the preset threshold, the object classifications of the adjacent pixels, and the number of pixels of the adjacent pixels in each object classification comprises:

when the object classifications of the adjacent pixels comprise the traffic lane classification, determining whether the number of pixels of the adjacent pixels corresponding to the traffic lane classification reaches the preset threshold;

when the number of pixels of the adjacent pixels corresponding to the traffic lane classification reaches the preset threshold, the position of the obstacles does not comprise the sidewalk object;

and/or when the object classifications of the adjacent pixels comprise the middle lane classification, determining whether the number of pixels of the adjacent pixels corresponding to the middle lane classification reaches the preset threshold; and     when the number of pixels of the adjacent pixels corresponding to the middle lane classification reaches the preset threshold, the position of the obstacles does not comprise the sidewalk object.

19. The system of claim 16, wherein the step of acquiring the adjacent pixels surrounding the obstacle classification comprises:

acquiring pixels on edges of the obstacle in the divided image as edge pixels; and     acquiring the adjacent pixels surrounding the obstacle classification based on the edge pixels of the obstacle.

20. The system of claim 15, wherein the step of acquiring the position of the obstacle corresponding to the obstacle classification based on the preset threshold, the object classifications of the adjacent pixels, and the number of pixels of the adjacent pixels in each object classification comprises:

when the object classifications of the adjacent pixels comprise the sidewalk classification, acquiring the preset threshold; the preset threshold contains the number of pixels of the adjacent pixels;

determining whether the number of pixels of the adjacent pixels corresponding to the sidewalk classification reaches the preset threshold; and     when the number of pixels of the adjacent pixels corresponding to the sidewalk classification reaches the preset threshold, the position of the obstacle comprises a sidewalk object.

\* \* \* \* \*